United States Patent
Kurihara (10) Patent No.: US 10,920,066 B2
(45) Date of Patent: Feb. 16, 2021

(54) RESIN COMPOSITION WITH POLYCARBONATE RESIN, ACRYLONITRILE-BUTADIENE-STYRENE RESIN, AND INORGANIC FILLER, RESIN MOLDED ARTICLE, METHOD FOR MANUFACTURING RESIN MOLDED ARTICLE, AND ELECTRONIC APPARATUS

(71) Applicant: CANON KABUSHIKI KAISHA, Tokyo (JP)

(72) Inventor: Daisuke Kurihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 16/222,156

(22) Filed: Dec. 17, 2018

(65) Prior Publication Data
US 2019/0194446 A1    Jun. 27, 2019

(30) Foreign Application Priority Data
Dec. 27, 2017    (JP) .............................. JP2017-251421

(51) Int. Cl.
| | | |
|---|---|---|
| C08L 69/00 | (2006.01) | |
| C08L 55/02 | (2006.01) | |
| C08L 53/00 | (2006.01) | |
| C08K 3/26 | (2006.01) | |

(52) U.S. Cl.
CPC ............... *C08L 55/02* (2013.01); *C08K 3/26* (2013.01); *C08L 53/00* (2013.01); *C08L 69/00* (2013.01); *C08K 2003/265* (2013.01); *C08L 2201/56* (2013.01); *C08L 2203/206* (2013.01); *C08L 2205/03* (2013.01); *C08L 2207/04* (2013.01)

(58) Field of Classification Search
None
See application file for complete search history.

(56) References Cited

U.S. PATENT DOCUMENTS 5,567,485 A * 10/1996 Tomita .................... C08L 55/02
428/295.1

FOREIGN PATENT DOCUMENTS

| CN | 103351592 | * 10/2013 |
| CN | 106009584 | * 10/2016 |
| JP | 4737236 B2 | 7/2011 |

* cited by examiner

*Primary Examiner* — David J Buttner
(74) *Attorney, Agent, or Firm* — Canon U.S.A., Inc., IP Division (57) ABSTRACT

A resin composition contains a polycarbonate resin, an acrylonitrile-butadiene-styrene resin, an elastomer, and an inorganic filler, in which, when the sum of the contents of the polycarbonate resin and the acrylonitrile-butadiene-styrene resin is set to 100 parts by mass, the content of the polycarbonate resin is 86 parts by mass or more and 96 parts by mass or less, the elastomer is an acrylic block copolymer, and the aspect ratio of the inorganic filler is 3 or more.

13 Claims, 4 Drawing Sheets

RESIN COMPOSITION WITH POLYCARBONATE RESIN, ACRYLONITRILE-BUTADIENE-STYRENE RESIN, AND INORGANIC FILLER, RESIN MOLDED ARTICLE, METHOD FOR MANUFACTURING RESIN MOLDED ARTICLE, AND ELECTRONIC APPARATUS

BACKGROUND OF THE INVENTION

Field of the Invention

The present disclosure relates to a resin composition, a resin molded article, and a method for manufacturing a resin molded article. The present disclosure also relates to an electronic apparatus for which the resin molded article is used.

Description of the Related Art

As an engineering plastic, a polycarbonate (PC) resin is excellent in terms of transparency, heat resistance, and the like. Due to the outstanding properties thereof, polycarbonate resins have been used in a wide range of fields, such as electric/electronic/OA equipment components, machine components, and components for vehicles. Moreover, in order to improve the impact strength and the moldability of polycarbonate resin, a resin obtained by mixing an acrylonitrile-butadiene-styrene (ABS) resin with polycarbonate resin has also been used in a wide range of fields.

In general, when a filler is compounded in a thermoplastic resin, such as a PC resin, the thermal conductivity or the mold shrinkage (dimensional stability) can be improved in proportion to the content of the filler. On the other hand, the impact strength tends to decrease proportionately to the filler content. Therefore, there has been a demand to improve impact strength while increasing the filler content.

To improve the impact strength of a resin molded article containing the polycarbonate resin and the acrylonitrile-butadiene-styrene resin which are the thermoplastic resins and the filler, Japanese Patent No. 4737236 discloses compounding an impact resistance improver, for example.

Since a resin molded article of Japanese Patent No. 4737236 contains the impact resistance improver, the impact resistance is improved. However, the impact resistance improver has a linear expansion coefficient higher than that of the polycarbonate resin or the acrylonitrile-butadiene-styrene resin. Therefore, there has been a disadvantage that the mold shrinkage of the resin molded article is increased as a result of the impact resistance improver being compounded therein.

Herein, when the content of the filler is increased, the mold shrinkage decreases. However, to maintain the impact strength, it is necessary to increase the content of a rubber component (elastomer) with an increase in the content of the filler. More specifically, the impact strength and the mold shrinkage have a trade-off relationship, and thus the resin molded article of Japanese Patent No. 4737236 has not been able to achieve both an improvement of impact strength and a reduction in mold shrinkage.

SUMMARY OF THE INVENTION

To achieve both high impact strength and low mold shrinkage, the present disclosure provides a resin molded article containing a polycarbonate resin, an acrylonitrile-butadiene-styrene resin, and an inorganic filler.

A resin composition of the present disclosure is a resin composition containing a polycarbonate resin, an acrylonitrile-butadiene-styrene resin, an elastomer, and an inorganic filler in which, when the sum of the contents of the polycarbonate resin and the acrylonitrile-butadiene-styrene resin is set to 100 parts by mass, the content of the polycarbonate resin is 86 parts by mass or more and 96 parts by mass or less, the elastomer is an acrylic block copolymer, and the aspect ratio of the inorganic filler is 3 or more.

Further features of the present disclosure will become apparent from the following description of exemplary embodiments with reference to the attached drawings.

DESCRIPTION OF THE EMBODIMENTS

Resin Composition

A resin composition of the present disclosure contains a polycarbonate resin (hereinafter referred to as a PC resin), an acrylonitrile-butadiene-styrene resin (hereinafter referred to as ABS resin), an elastomer, and an inorganic filler. Herein, the resin composition includes so-called resin molded bodies, such as a resin obtained by molding the resin composition with a die or the like and a sheet-like or plate-like resin obtained by extrusion molding, injection molding, or the like.

Polycarbonate (PC) Resin

The content of the PC resin contained in the resin composition of the present disclosure is 86 parts by mass or more and 96 parts by mass or less when the sum of the content of the PC resin and the content of the ABS resin is set to 100 parts by mass.

The PC resin is a polymer of a basic structure represented by the following general formula (I). In the formula, X is generally a hydrocarbon group but may be a group having a hetero atom or a hetero bond to obtain desired properties.

$$-(-O-X-O-C(=O)-)- \qquad (I)$$

Although PC resins may be classified into various types, the type of the PC resin contained in the resin composition of the present disclosure is not particularly limited. An aromatic PC resin or an aliphatic PC resin may be acceptable, and a siloxane-modified PC resin having a siloxane bond in the structure and the like may also be acceptable. However, from the viewpoint of heat resistance, mechanical strength (impact strength), and conductivity, an aromatic PC resin may be used. One kind of PC resin may be used alone, or two or more kinds of PC resins may be used in combination in an arbitrary ratio.

For the PC resin, commercial products and mixtures thereof are usable. Examples of commercially available items include Iupilon (Product Name) manufactured by Mitsubishi Engineering-Plastics Corporation, TARFLON (Product Name) manufactured by Idemitsu Kosan Co., Ltd., and the like, for example.

ABS Resin

The content of the ABS resin contained in the resin composition of the present disclosure is 4 parts by mass or more and 14 parts by mass or less when the sum of the content of the PC resin and the content of ABS resin is set to 100 parts by mass.

The resin composition of the present disclosure has good impact strength when the content ratio of the PC resin and ABS resin satisfies the ranges mentioned above in molding. When the content of the ABS resin exceeds 14 parts by mass, the ratio of the PC resin having high impact strength decreases, and accordingly, the impact strength decreases. On the other hand, when the content of the ABS resin is less than 4 parts by mass, it is difficult for the ABS resin to come into sufficiently close proximity with or make sufficient contact with the filler. Therefore, when the resin composition is subjected to an impact with a hammer or the like, stress generated in the interface between the resin and the filler cannot be sufficiently reduced, and as a result, the impact strength of a resin molded article decreases. The impact strength may be 10.0 kJ/m$^2$ or more.

The ABS resin may coat the filler with an acrylic block copolymer in the resin composition of the present disclosure. This is to further improve the impact strength of the resin molded article.

Here, "ABS resin" generally denotes an ABS resin containing, as the main component, a copolymer containing mainly three components of acrylonitrile, butadiene, and styrene in which polybutadiene is uniformly dispersed in an acrylonitrile-styrene resin, which is a copolymer of acrylonitrile and styrene.

The type of the ABS resin contained in the resin composition of the present disclosure is not particularly limited. One kind of ABS resin may be used alone or two or more kinds of ABS resins may be combined in an arbitrary ratio. Methods for producing the same are not particularly limited, and ABS resins manufactured by known suspension polymerization methods, emulsion polymerization methods, bulk polymerization methods, and the like are usable.

For the ABS resin, commercial products and mixtures thereof are also usable. Examples of commercially available items include Styrac (Product Name) manufactured by Asahi Kasei Corporation, CEVIAN (Product Name) manufactured by Daicel Polymer Ltd., and the like, for example.

Moreover, polymer alloys which are mixtures of the PC resin and the ABS resin are also usable. Examples of commercially available items include Multilon (Product Name) manufactured by Teijin, Ltd., Novalloy (Product Name) manufactured by Daicel Polymer Ltd., and the like, for example.

Elastomer

The elastomer contained in the resin composition of the present disclosure is an acrylic block copolymer. Here, "acrylic block copolymer" denotes an acrylic block copolymer containing, as the main component, a copolymer having one or more kinds of polymeric blocks obtained by polymerizing monomer components containing methacrylic acids and derivatives thereof. The acrylic block copolymer is excellent in compatibility with thermoplastic resins, such as the PC resin and the ABS resin. Therefore, the acrylic block copolymer is softened by heating to exhibit flowability and, after being cooled, plays a role of a rubber-like elastic body in the resin composition of the present disclosure. In the resin composition of the present disclosure, the acrylic block copolymer mainly comes into close proximity with the ABS resin and the filler and is dispersed. Therefore, the acrylic block copolymer has a role of reducing stress generated in the interface between the filler and the PC resin and the ABS resin to suppress the generation of voids in the resin composition of the present disclosure.

The type of the acrylic block copolymer contained in the resin composition of the present disclosure is not particularly limited. Examples of usable acrylic block copolymers include those containing a polymer block containing constituent units derived from acrylic acid esters and a polymer block containing constituent units derived from methacrylic acid esters, for example.

Examples of the constituent units derived from acrylic acid esters in the polymer block containing the constituent units derived from acrylic acid esters include methyl acrylate, ethyl acrylate, propyl acrylate, butyl acrylate, and isobutyl acrylate, for example. Moreover, acrylic acid-n-octyl, dodecyl acrylate, acrylic acid-2-ethylhexyl, stearyl acrylate, phenyl acrylate, dimethyl aminoethyl acrylate, and the like are mentioned. These substances are constituent units derived from monomers and one kind or two or more kinds thereof are used.

Examples of the constituent units derived from methacrylic acid esters in the polymer block containing the constituent units derived from methacrylic acid esters include methyl methacrylate, ethyl methacrylate, propyl methacrylate, butyl methacrylate, and hexyl methacrylate, for example. Moreover, cyclohexyl methacrylate, octyl methacrylate, nonyl methacrylate, octadecyl methacrylate, dodecyl methacrylate, 2-ethylhexyl methacrylate, and the like are mentioned. These substances are constituent units derived from monomers and one kind or two or more kinds thereof are used.

The state of the molecular chain of the acrylic block copolymer is not particularly limited and may be any one of a linear state, a branched state, a radial state, or the like, for example.

For the acrylic block copolymer, commercial products and mixtures thereof are also usable. Examples of commercially available items include KURARITY (Trade Name) manufactured by Kuraray Co., Ltd., and the like, for example.

The content of the acrylic block copolymer contained in the resin composition of the present disclosure is not particularly limited insofar as the impact strength and the mold shrinkage of the resin composition (resin molded article) are not impaired. However, from the viewpoint of further improving the impact strength and the mold shrinkage, the content of the acrylic block copolymer is preferably 2 parts by mass or more and 30 parts by mass or less when the sum of the contents of the PC resin and the ABS resin is set to 100 parts by mass. When the content of the acrylic block copolymer is less than 2 parts by mass, there is a possibility that the impact strength does not reach a sufficient value. On the other hand, when the content of the acrylic block copolymer exceeds 30 parts by mass, there is a possibility that the mold shrinkage increases.

The dispersion state of the acrylic block copolymer in the resin composition can be evaluated by a high-resolution Fourier transform infrared spectroscopic method (nano-IR) or the like, for example.

Inorganic Filler

The content of the inorganic filler contained in the resin composition of the present disclosure is preferably 20 parts by mass or more and 100 parts by mass or less when the sum of the contents of the PC resin and the ABS resin is set to 100 parts by mass. This is to achieve both sufficient impact strength and sufficient mold shrinkage of the resin composition (resin molded article). The content is more preferably 72 parts by mass or more and 93 parts by mass or less. When the content of the filler is less than 72 parts by mass, there is a possibility that the mold shrinkage increases. On the other hand, when the content of the filler exceeds 93 parts by mass, there is a possibility that the impact strength decreases. Herein, the mold shrinkage is a parameter expressed as a percentage indicating the degree of volume change of the resin composition (resin molded article) and may be obtained by dividing a difference between the length of the resin composition immediately after the molding and the length after a certain period of time has elapsed by the length of the resin composition immediately after the molding. Herein, the resin composition may have few volume changes. In this specification, the certain period of time is set to about one week after molding, and the mold shrinkage is preferably 0.60% or less. The mold shrinkage is more preferably 0.50% or less and still more preferably 0.35% or less.

The aspect ratio of the inorganic filler contained in the resin composition of the present disclosure is 3 or more. Due to the fact that the filler having an aspect ratio of 3 or more is contained, the resin composition (resin molded article) of the present disclosure can suppress the growth of a crack upon progression of impact breakage due to an impact with a hammer or the like. The aim here is for the filler to be present to create a bridge between resins in a direction of expansion of the crack occurring in the resin. Such a structure is referred to as a crosslinking structure.

On the other hand, when the aspect ratio of the filler is less than 3, the shape of the filler particles approaches a spherical shape. Therefore, it is difficult to form the crosslinking structure when the impact breakage progresses and it is difficult to obtain sufficient impact strength. The aspect ratio of the filler is preferably 4 to 5. When the aspect ratio exceeds 20, there is a possibility that the filler is easily broken. The aspect ratio in this specification is an average aspect ratio defined as the average major axis dimension/average minor axis dimension of the filler particles.

Figure 3A:
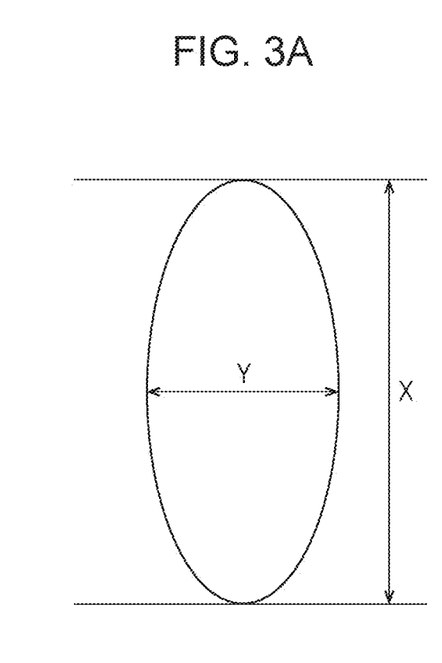
FIGS. 3A to 3C are schematic views illustrating the aspect ratio of an inorganic filler.
Figure 3B:
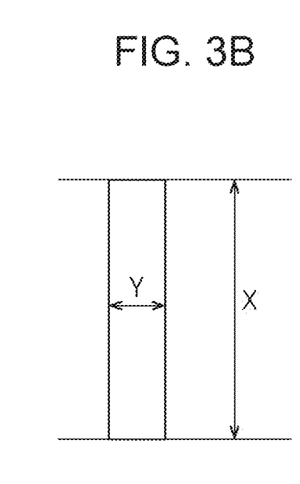
Figure 3C:
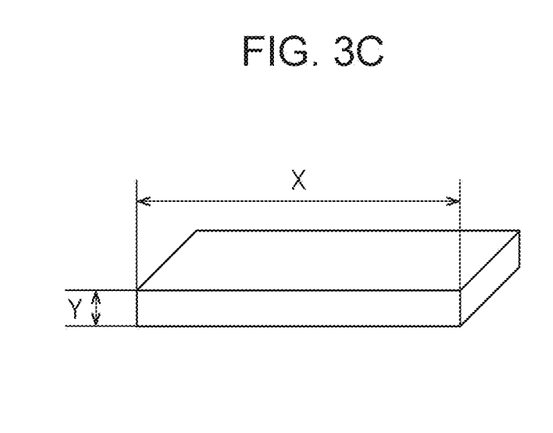

The average major axis dimension, the average minor axis dimension, and the average aspect ratio of the fillers can be obtained by applying a method involving image processing of a micrograph obtained by using a scanning electron microscope (SEM) or the like. Herein, "average" with respect to the average major axis dimension and the average minor axis dimension denotes an average value obtained by measuring a reliable number (N) of the filler particles. The number (N) of the filler particles is at least 10 or more and preferably 100 or more. The average major axis dimension of the filler particles is the average value of the length in the longitudinal direction (length of the long side) when the filler particles are regarded to have a rectangular parallelepiped form. The average minor axis dimension of the filler particles is an average value of the length in the lateral direction (length of the short side) when the filler particles are regarded to have a rectangular parallelepiped form. FIGS. 3A to 3C are cross-sectional views imitating the filler particles and illustrate a major axis X and a minor axis Y.

FIG. 3A illustrates a spindle-shaped filler particle, FIG. 3B illustrates a cylindrical filler particle, and FIG. 3C illustrates a plate-shaped filler particle.

The type of the inorganic filler particles contained in the resin composition of the present disclosure is not particularly limited insofar as the aspect ratio is 3 or more and known inorganic fillers are usable irrespective of the particle shapes, such as plate shape, fibrous shape, and granular shape.

The inorganic fillers usable for the resin composition of the present disclosure are needle-like substances, such as glass fibers, carbon fibers, aramid fibers, vinylon fibers, alumina fibers, and metal fibers and potassium titanate, PMF (slag fiber), wollastonite, xonotolite, and the like are mentioned, for example. Moreover, phosphate fiber, gypsum fiber, MOS, dawsonite, needle-like MgO, aluminum borate, asbestos, needle-like magnesium hydroxide, various whiskers, precipitated calcium carbonate, talc, mica, sericite, glass flakes, various metallic foils, and the like are mentioned. Moreover, graphite, BN (hexagonal), MIO (plate-like iron oxide), plate-like calcium carbonate, plate-like aluminum hydroxide, clay, various ore crushed products, and the like are mentioned.

Among the above, wollastonite and precipitated calcium carbonate may be used from the viewpoint of obtaining high impact strength. Precipitated calcium carbonate may be particularly used. The precipitated calcium carbonate is spindle-shaped calcium carbonate manufactured by a chemical reaction and is not particularly limited with respect to manufacturing methods, structures, components contained as impurities, and the like.

The precipitated calcium carbonate can be manufactured by reacting calcium hydroxide with carbon dioxide, for example. The calcium hydroxide can be manufactured by reacting calcium oxide with water, for example. The calcium oxide can be manufactured by performing mixed combustion of limestone ore with coke or the like, for example. In this case, carbon dioxide is produced during firing, and therefore calcium carbonate can be manufactured by reacting the carbon dioxide with calcium hydroxide. Examples of commercially available products include Precipitated calcium carbonate (Product Name) manufactured by New Lime Co., Ltd., Bright series PC (Product Name) manufactured by SHIRAISHI KOGYO KAISHA, LTD., Precipitated calcium carbonate (Product Name) manufactured by KONOSHIMA Co., Ltd., and the like, for example.

As the fillers contained in the resin composition, one kind of filler may be acceptable or two or more kinds of fillers may be acceptable. The surface of the filler may be treated beforehand with various surface treatment agents, such as a silane coupling agent, a titanium coupling agent, an organic fatty acid, alcohol, and an amine, wax, silicone resin, or the like.

In the resin composition of the present disclosure, the filler surface may be coated with the ABS resin and the acrylic block copolymer. Accordingly, the filler and the acrylic block copolymer are in close proximity to each other, and as a result, stress generated in the interface between the resin and the filler can be effectively reduced.

Method for Measuring Component Ratio of Resin Composition

The component ratio of the resin composition of the present disclosure can be measured by combining known separation techniques and analytical techniques. Although methods or procedures thereof are not particularly limited, a component of a solution obtained by extracting an organic component from a resin composition is separated with various types of chromatography or the like, and thereafter, analysis of the components can proceed, for example.

To extract the organic component from the resin composition, the resin composition may be dipped in a solvent capable of dissolving the organic component for dissolution. The time required for the extraction can be shortened by finely crushing the resin composition or heating and stirring the solvent beforehand.

The solvent to be used can be arbitrarily selected according to the polarity of the organic component forming the resin composition. Solvents, such as aromatic solvents, such as toluene and xylene, tetrahydrofuran or dioxane, methylene chloride, chloroform, and N-methyl pyrrolidone may be used. These solvents may be mixed in an arbitrary ratio.

Herein, by drying and weighing a residue remaining after separating the organic component, the content of an inorganic component contained in the resin composition can be determined. In addition, as a method for determining the content of the inorganic component of the resin composition, also mentioned is a method that includes increasing the temperature to the decomposition temperature of the resin or higher by thermogravimetric analysis (TGA) or the like, and then quantitating the ash.

Moreover, by performing X-ray fluorescence analysis (XRF) on a sample (for example, a sample having a disk shape 6 mm in diameter) obtained by drying a residue remaining after extracting the organic component, elements contained in the inorganic component and the component ratio thereof can be determined.

From the solution obtained by extracting the organic component from the resin composition, a component can be separated by methods, such as various types of chromatography. Low-molecular-weight additives can be separated by gas chromatography (GC) or high-speed liquid phase column chromatography (HPLC), and high-molecular-weight polymers can be separated by gel permeation chromatography (GPC) and the like. Particularly when a crosslinking polymer or a gel having a large molecular weight is contained or when micelles are formed in a liquid, centrifugal separation or separation by a semipermeable membrane can also be selected.

The separated organic component can be analyzed with known analytical methods, such as nuclear magnetic resonance (NMR) spectrum measurement, infrared absorption (IR) spectrum measurement, Raman spectrum measurement, mass spectrum measurement, and ultimate analysis.

Structure of Resin Molded Article

Figure 1:
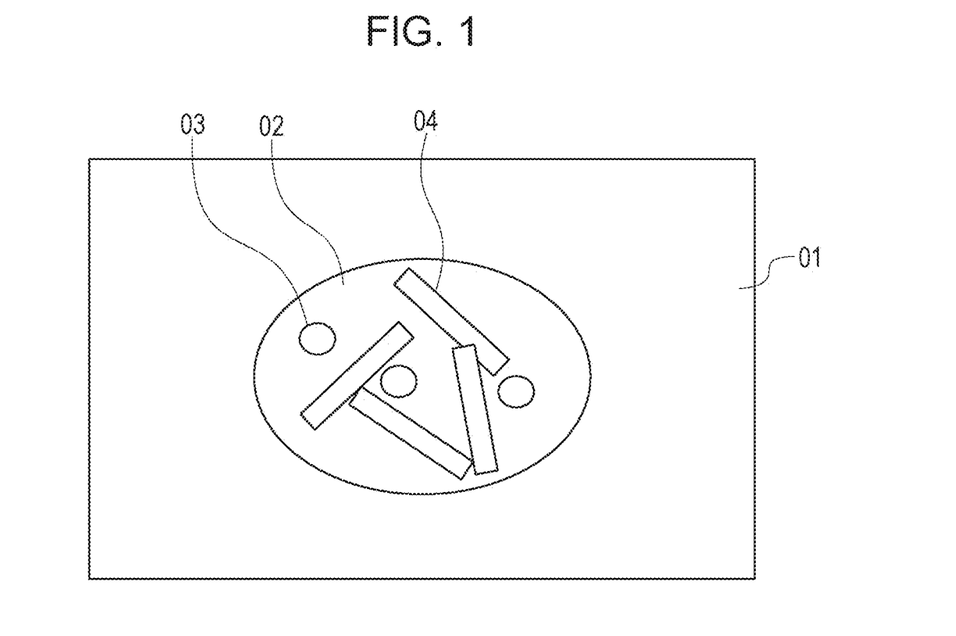
FIG. 1 is a cross-sectional schematic view illustrating one embodiment of the structure of a resin molded article of the present disclosure.
Figure 2:
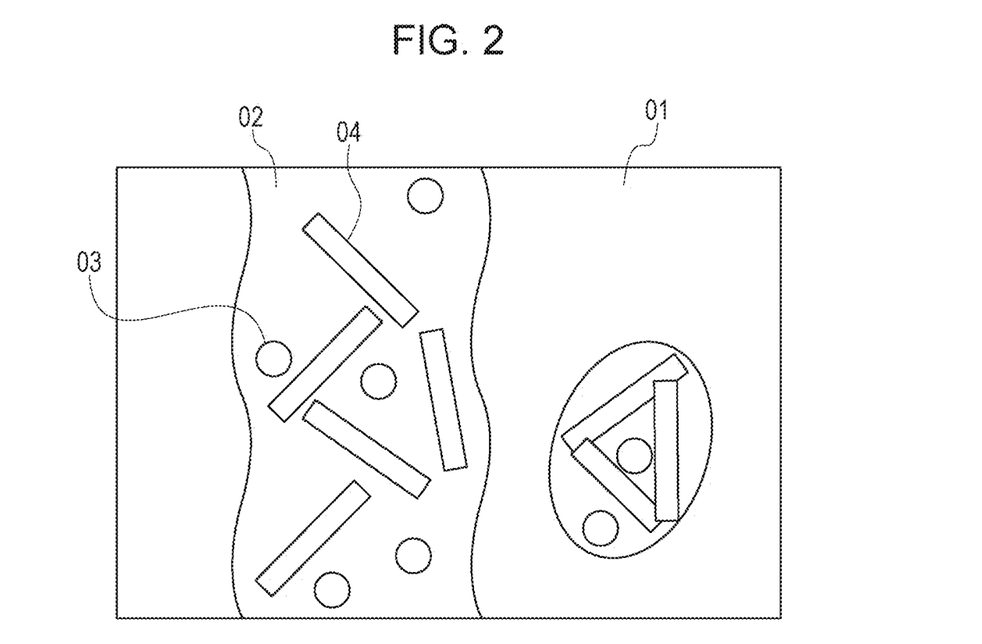
FIG. 2 is a cross-sectional schematic view illustrating one embodiment of the structure of a resin molded article of the present disclosure.

FIG. 1 and FIG. 2 are cross-sectional schematic views illustrating the outline of one embodiment of the structure of the resin composition of the present disclosure.

In FIG. 1, a resin phase 01 contains the PC resin and forms mainly a continuous phase. A resin phase 02 contains the ABS resin and forms mainly a dispersed phase having an area (region) smaller than that of the continuous phase. The relationship between such a continuous phase and such a dispersed phase is referred to as a sea-island structure. It can be said that the PC resin forms the sea and the ABS resin forms the island.

Also in FIG. 2, the resin phase 02 contains the ABS resin and forms both a continuous phase and a dispersed phase and forms a co-continuous structure with the resin phase 01 containing the PC resin.

In both FIG. 1 and FIG. 2, resin phases 03 contain the acrylic block copolymer and are dispersed in the resin phase 02 containing mainly the ABS resin. Some or all of the filler 04 are dispersed in the resin phase 02 containing the ABS resin or the resin phase 03 containing the acrylic block copolymer.

To increase the impact strength of the resin composition (resin molded article) of the present disclosure, a structure may be formed in which a larger amount of the fillers 04 and a larger amount of the resin phase 02 containing the ABS resin or the resin phase 03 containing the acrylic block copolymer are in contact or in close proximity. Accordingly, the stress generated in the interface between the resin component and the filler is reduced.

To suppress the growth of a crack occurring when an impact is applied to a molded article of the resin composition of the present disclosure, the resin phase 02 containing the ABS resin or the resin phase 03 containing the acrylic block copolymer containing the fillers 04 may form a dispersed phase. Accordingly, because the filler particles 04 are in close proximity with the resin phases 01, 02, and 03, when a crack occurs, a crosslinking structure forms easily between the resins.

Moreover, the formation of the dispersed phase enables the fillers 04 to be easily coated with the resin 03 containing the acrylic block copolymer, and as a result, stress generated in the interface between the fillers 04 and the resin phases 01 and 02 can be effectively reduced.

Method for Manufacturing Resin Molded Article

A method for manufacturing a resin molded article of the present disclosure is not particularly limited to a specific method, and mixing methods generally employed for a thermoplastic resin are usable. For example, the resin molded article of the present disclosure can be manufactured by performing mixing and kneading with mixers, such as a tumbler, a V-type blender, a Banbury mixer, a kneading roll, a kneader, a single-screw extruder, and a multi-screw extruder having two or more screws. In particular, melting and kneading by using a biaxial extruder has excellent productivity.

In the manufacturing of the resin molded article, a plurality of components of the PC resin, the ABS resin, the acrylic block copolymer, the filler, and the other additives to be used as necessary may be mixed or kneaded beforehand (premixing or prekneading) or may be simultaneously mixed or kneaded. Particularly in the manufacturing with an extruder, kneading which includes performing successive additions in an extrusion process by providing an individual feeder for each component can also be performed. The resin composition (molded article) of the present disclosure is formed such that a structure in which the ABS resin is in contact with the periphery of the filler is induced, and therefore, the resin composition (molded article) of the present disclosure can exhibit high impact strength (impact value) also when simultaneously kneaded.

Examples of the other additives include lubricants and mold-release agents, such as fatty acid amides, fatty acid esters, and metal salts of fatty acids, ultraviolet absorbers, such as benzotriazole compounds, benzophenone compounds, and phenyl salicylate compounds, hindered amine stabilizers, and the like. Moreover, examples of the other additives include phenol-based or phosphorus-based antioxidants, tin-based heat stabilizers, various antistatic agents, slidability improvers, such as polysiloxane, colorants of various pigments or dyes typified by titanium oxide or carbon black, and the like. Moreover, examples of the other additives include various surface treatment agents, such as a silane coupling agent, a titanium coupling agent, organic fatty acids, alcohols, and amines, wax, silicone resin, and the like.

Among the above, the lubricants and the mold-release agents, such as fatty acid amides, fatty acid esters, and metal salts of fatty acids, the various surface treatment agents, such as a silane coupling agent, a titanium coupling agent, organic fatty acids, alcohols, and amines, the wax, and the silicone resin can be effectively used as processing aids. The addition of the processing aids not only suppresses the pyrolysis of a thermoplastic resin composition by reducing the temperature in melting and kneading but also promotes the dispersion of the filler. In particular, a polyglycerol fatty acid ester may be able to be particularly used as the processing aid. This is because the polyglycerol fatty acid ester can effectively coat the surface of the filler as a result of an interaction of a hydroxyl group with the filler. Moreover, this is because the fatty acid structure also simultaneously exhibits compatibility with the ABS resin, and therefore contact between the filler and the ABS resin can be promoted.

When the additives above are premixed with any one or two or more of the PC resin, the ABS resin, and the acrylic block copolymer, the mixing may be performed by a dry method or a wet method. In the dry method, stirring is performed using a stirrer, such as a Henschel mixer or a ball mill. In the wet method, a thermoplastic resin is added to a solvent and stirred, and then a solvent is removed after mixing.

In the manufacturing by melting and kneading, the kneading temperature, the kneading time, and the sending-out speed can be arbitrarily set according to the type or the performance of kneading devices and the properties of the components of the PC resin, the ABS resin, the acrylic block copolymer, the filler, and the other additives to be used as necessary. The kneading temperature is usually 160 to 300° C. When this temperature is excessively low, the dispersion of the filler is blocked. When this temperature is excessively high, the pyrolysis of the PC resin, the ABS resin, and the acrylic block copolymer poses a problem. Accordingly, there is a possibility that a reduction in physical properties or poor appearance of a molded article occurs.

A thermoplastic resin composition obtained by the manufacturing process described above can be easily molded by generally used molding methods, such as extrusion molding, injection molding, and compression molding, and can be applied to blow molding, vacuum molding, two-color molding, and the like.

Electronic Apparatus

Figure 4:
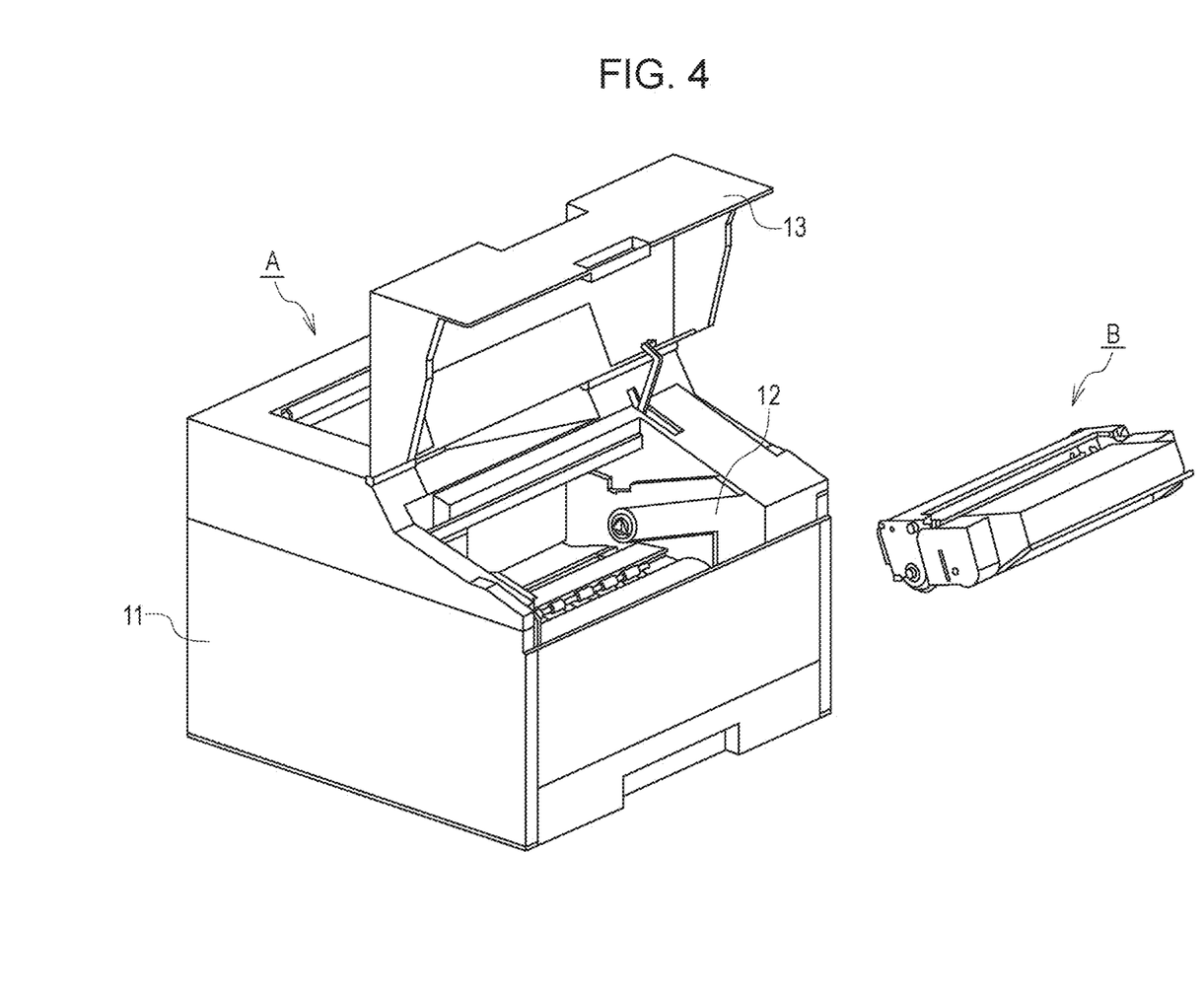
FIG. 4 is a schematic view illustrating one embodiment of an electronic apparatus of the present disclosure.

An electronic apparatus of the present disclosure is an electronic apparatus including an exterior component having a resin molded article, in which the resin molded article is the resin molded article of the present disclosure. FIG. 4 is a schematic view illustrating one embodiment of the electronic apparatus (image forming device) of the present disclosure.

An image forming device A is a device to which a cartridge B is detachably attached and has a casing 11 and an opening and closing door 13 as exterior components. Herein, FIG. 4 illustrates a state where the opening and closing door 13 is opened. The cartridge B is attached to the image forming device A along a guide rail 12. The resin composition of the present disclosure has low mold shrinkage, and therefore can be manufactured into components having various shapes, such as the casing 11 or the opening and closing door 13, with sufficient accuracy. Moreover, the resin composition of the present disclosure has high impact strength, and therefore can provide an image forming device which is less likely to be deformed by an impact from the outside.

Although the image forming device has been described as the electronic apparatus, the present disclosure is applicable to various electronic apparatuses which are required to have high impact strength and low mold shrinkage, such as a body portion of a camera and a smartphone.

EXAMPLES

The present disclosure is specifically described with reference to Examples but is not particularly limited to Examples. Raw materials used in common in Examples are as follows.

Resin (A) PC resin: TARFLON A1900 manufactured by Idemitsu Kosan Co., Ltd.

(B) PC/ABS resin: Multilon TN-7500MC (Compositon ratio: 80 part by mass PC resin:20 parts by mass ABS resin) manufactured by Teijin, Ltd.

Elastomer (C-1) Acrylic block copolymer: KURARITY LA2250 manufactured by Kuraray Co., Ltd.

(C-2) Butadiene-based core-shell elastic polymer: Metablen E860A manufactured by Mitsubishi Rayon Co., Ltd.

Inorganic Filler (D-1) Precipitated calcium carbonate of average quality (Aspect ratio: 4) manufactured by New Lime Co., Ltd.

(D-2) Wollastonite K-330 (Aspect ratio: 5) manufactured by Keiwa Rozai Co., Ltd.

(D-3) NS #100 (Aspect ratio: 1) manufactured by NITTO FUNKA KOGYO K.K.

Additives (E) 50% by mass ethanol diluted article of Chirabazol H-818 (Main component: polyglycerol condensed fatty acid ester) manufactured by TAIYO KAGAKU CO., LTD.

Production of Resin Composition

A resin (A), a resin (B), an elastomer (C), and an additive (E) were mixed at compounding ratios given in Table 1, and further a filler (D) was added to produce a uniform raw material mixture. The raw material mixture was melded and kneaded at a cylinder temperature of 230° C. with a biaxial kneading extruder (PCM30 manufactured by IKEGAI CORP.), and then cured. Then, a resin of pellet-shaped particles was obtained using a strand cutter.

The (A) part by mass and the (B) part by mass of Table 1 indicate the part by mass of the resin (A) and the part by mass of the resin (B), respectively, when the sum of the resins (A) and (B) is set to 100 parts by mass. Similarly, the PC resin part by mass and the ABS resin part by mass indicate the part by mass of the PC resin and the part by mass of the ABS resin, respectively, when the sum of the contents of the PC resin and the ABS resin is set to 100 parts by mass. The (C) part by mass, the (D) part by mass, and the (E) part by mass indicate the part by mass of (C), the part by mass of (D), and the part by mass of (D), respectively, when the sum of the contents of the PC resin and the ABS resin is set to 100 parts by mass.

TABLE 1

| | (A) part by mass | (B) part by mass | PC resin part by mass | ABS resin part by mass | (C) type | (C) part by mass | (D) type | (D) aspect ratio | (D) part by mass | (E) part by mass |
|---|---|---|---|---|---|---|---|---|---|---|
| Ex. 1 | 30 | 70 | 86 | 14 | C-1 | 20 | D-1 | 4 | 80 | 6 |
| Ex. 2 | 40 | 60 | 88 | 12 | | | | | | |
| Ex. 3 | 60 | 40 | 92 | 8 | | | | | | |
| Ex. 4 | 80 | 20 | 96 | 4 | | | | | | |
| Ex. 5 | 60 | 40 | 92 | 8 | | | | | 93 | |
| Ex. 6 | 60 | 40 | 92 | 8 | | | | | 72 | |
| Ex. 7 | 60 | 40 | 92 | 8 | | | D-2 | 5 | 80 | |
| Ex. 8 | 60 | 40 | 92 | 8 | | | D-1 | 4 | 68 | |
| Comp. Ex. 1 | 0 | 100 | 80 | 20 | None | 0 | None | — | 0 | 0 |
| Comp. Ex. 2 | 0 | 100 | 80 | 20 | C-1 | 20 | D-1 | 4 | 80 | 6 |
| Comp. Ex. 3 | 10 | 90 | 82 | 18 | | | | | | |
| Comp. Ex. 4 | 20 | 80 | 84 | 16 | | | | | | |
| Comp. Ex. 5 | 95 | 5 | 99 | 1 | | | | | | |
| Comp. Ex. 6 | 100 | 0 | 100 | 0 | | | | | | |
| Comp. Ex. 7 | 60 | 40 | 92 | 8 | | | None | — | 0 | 0 |
| Comp. Ex. 8 | 60 | 40 | 92 | 8 | | | D-3 | 1 | 80 | 6 |
| Comp. Ex. 9 | 60 | 40 | 92 | 8 | None | 0 | D-1 | 4 | | |
| Comp. Ex. 10 | 60 | 40 | 92 | 8 | C-2 | 20 | | | | |

Production of Resin Molded Article

Each of the obtained resin compositions of pellet-shaped particles was injection molded using an injection molding machine (SE-180D manufactured by Sumitomo Heavy Industries, Ltd.). At this time, the cylinder temperature was set to 230° C. and the die temperature was set to 80° C., and then a rectangular-shaped test piece Type B1 specified by JIS K7152-1 (80 mm in length×10 mm in width×4 mm in thickness) was produced. An impact strength test and mold shrinkage evaluation were performed using the test pieces by the following measuring methods.

Impact Strength Test

The molded strip-like test piece was subjected to notching (Shape A) using a notching machine No. 189-PN (manufactured by YASUDA SEIKI SEISAKUSHO, LTD.) according to JIS K7111 to create an edgewise test piece. The test piece was subjected to a Charpy impact test using a digital impact tester No. 258-D (manufactured by YASUDA SEIKI SEISAKUSHO, LTD.) according to JIS K7111-1. The mass of the used hammer was 0.5 J. The average value of five tests was defined as a Charpy impact value (impact strength). The measurement temperature was set to 23° C.±3° C. and the relative humidity was set to 55±5%.

Mold Shrinkage Evaluation

A value obtained by dividing a difference between a length m immediately after the molding and a length n after one week by the length m immediately after the molding, and then expressing the obtained value as a percentage was defined as the mold shrinkage.

Herein, the length m immediately after the molding was the inside dimension of a site equivalent to the length in the resin flowing direction of a die of an injection molding machine. The length n of the test piece one week after the molding was measured with slide calipers one week after the molding. The measurement temperature was set to 23° C.±3° C. and the relative humidity was set to 55±5%.

The results of the Charpy impact values and the mold shrinkage of Examples 1 to 8 and Comparative Examples 1 to 10 are given in Table 2.

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Impact strength (kJ/m$^2$) | 10.0 | 10.5 | 11.3 | 11.0 | 10.1 | 12.3 | 10.8 | 12.8 |
| Mold shrinkage (%) | 0.32 | 0.31 | 0.32 | 0.33 | 0.28 | 0.48 | 0.30 | 0.58 |

| | Comp. Ex. 1 | Comp. Ex. 2 | Comp. Ex. 3 | Comp. Ex. 4 | Comp. Ex. 5 |
|---|---|---|---|---|---|
| Impact strength (kJ/m$^2$) | 9.8 | 9.1 | 8.2 | 8.5 | 8.4 |

TABLE 2-continued

| | | | | | |
|---|---|---|---|---|---|
| Mold shrinkage (%) | 0.56 | 0.35 | 0.33 | 0.31 | 0.31 |

| | Comp. Ex. 6 | Comp. Ex. 7 | Comp. Ex. 8 | Comp. Ex. 9 | Comp. Ex. 10 |
|---|---|---|---|---|---|
| Impact strength (kJ/m$^2$) | 8.7 | Not broken | 8.1 | 3.2 | 6.8 |
| Mold shrinkage (%) | 0.35 | 0.84 | 0.41 | 0.28 | 0.42 |

It can be confirmed from Table 2 that the impact strength is 10.0 kJ/m$^2$ or more in Examples 1 to 8 in which the content of the PC resin is 86 parts by mass or more and 96 parts by mass or less when the sum of the PC resin and the ABS resin is set to 100 parts by mass and impact strength higher than the impact strength of Comparative Examples 1 to 6 was able to be obtained. Examples 1 to 8 had good mold shrinkage of 0.60% or less and Examples 1 to 7 had particularly good mold shrinkage of 0.48% or less.

On the other hand, in Comparative Example 7 in which, when the sum of the PC resin and the ABS resin is set to 100 parts by mass, the content of the PC resin is 86 parts by mass or more and 96 parts by mass or less but which did not contain a filler, the mold shrinkage was 0.84%, which was higher than the mold shrinkage of Examples.

In Comparative Example 8 in which the aspect ratio of the filler is 1, the impact strength was lower than the impact strength of Example 3 and Example 7 which were the same as Comparative Example 8, except that the materials of the fillers were different (aspect ratios were different). Moreover, the mold shrinkage was also high.

In Comparative Example 9 not containing an elastomer, the impact strength was lower than the impact strength of Example 3 which was the same as Comparative Example 9, except that an elastomer was not contained.

In Comparative Example 10 containing an elastomer other than the acrylic block copolymer, the impact strength was lower than the impact strength of Example 3 in which the same amount of the acrylic block copolymer was added.

As described above, it was found that Examples 1 to 8 are the resin compositions excellent in the physical property balance between the impact strength and the mold shrinkage.

Structure Evaluation

The evaluation of the structure of the resin molded article was performed by the following method.

First, the Transverse Direction (TD) plane and a central portion of the molded strip-like test piece were cut out to create 100 nm thick test pieces for structure evaluation, and then the test pieces were dyed using ruthenium tetroxide. The dyeing was performed to a portion having an aliphatic C—H structure, and then performed to the ABS resin and the acrylic block copolymer.

Then, carbon was vapor-deposited to the dyed sections, and then the sections were measured under a transmission electron microscope.

The orders of the cutting-out process and the two dyeing processes may be changed according to the brittleness of the resin or the penetration speed of a dyeing agent.

Figure 5:
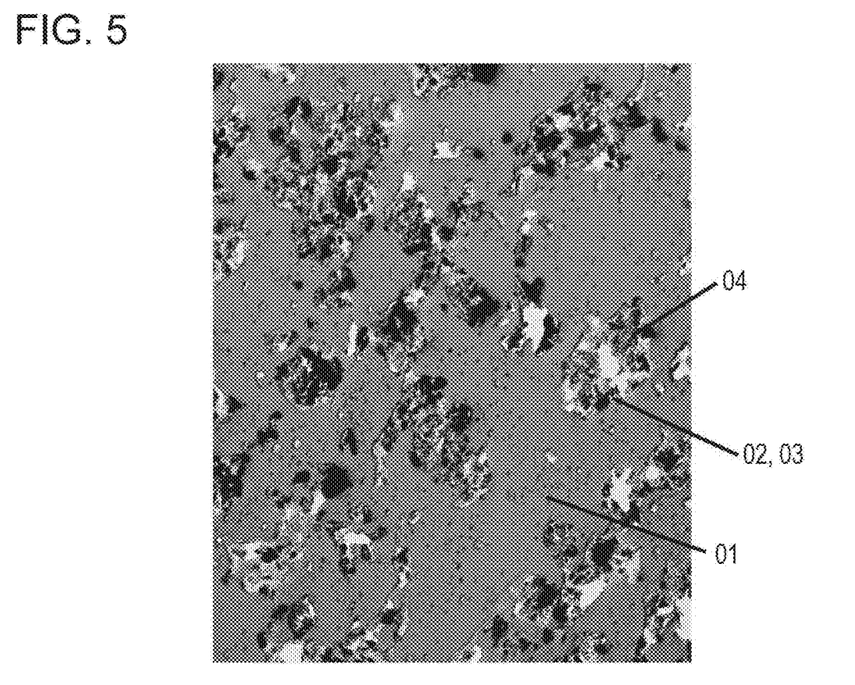
FIG. 5 is an image in which the cross section of a resin molded article of Example 3 is observed under a transmission electron microscope.
Figure 6:
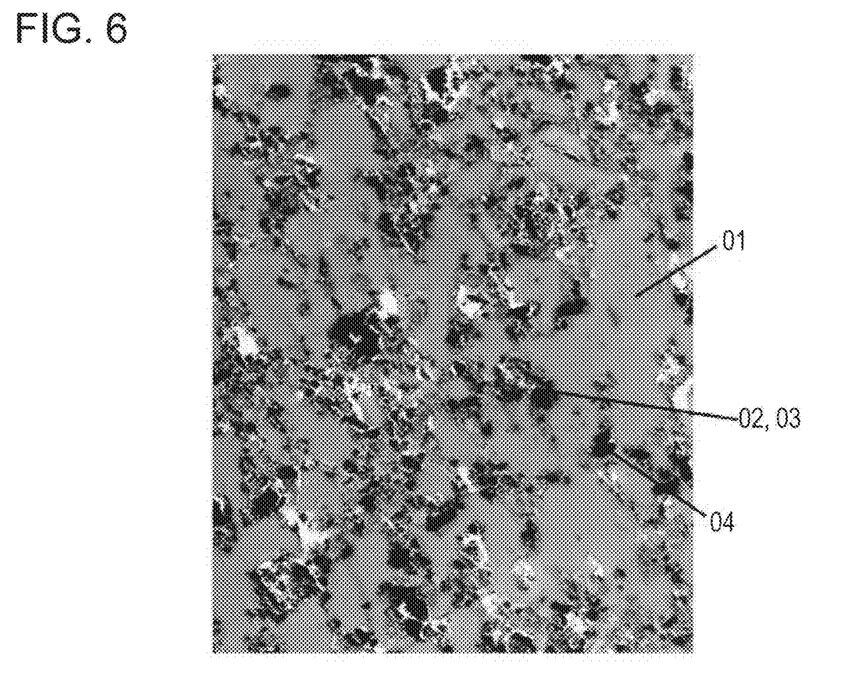
FIG. 6 is an image in which the cross section of a resin molded article of Comparative Example 2 is observed under a transmission electron microscope.

FIG. 5 is an image of the resin composition of Example 3. FIG. 6 is an image of the resin composition of Comparative Example 2. Specifically, the TD (Transverse Direction) plane and a central portion of the molded strip-like test piece were cut out to create test pieces for structure evaluation, and then the test pieces were observed under a transmission electron microscope (H-8100 manufactured by Hitachi High-Technologies Corporation). Herein, the observation conditions were set such that the magnification was 10000 times and the acceleration voltage was 100 kV.

It can be confirmed in Example 3 of FIG. 5 that the PC resin forms a continuous phase, the ABS resin and the acrylic block copolymer form a dispersed phase, and most of fillers 04 are dispersed in resin phases 02 and 03 containing the ABS resin and the acrylic block copolymer. Due to the fact that the resin composition has the structure, the acrylic block copolymer and the fillers 04 come into close proximity with each other, and as a result, the stress generated in the interface between the resin and the fillers 04 can be effectively reduced. The fillers also easily come into close proximity with each other, and accordingly, when a crack occurs, a crosslinking structure can be easily formed. Therefore, it was found that the resin composition has excellent impact strength.

On the other hand, it can be confirmed in Comparative Example 2 of FIG. 6 that the ABS resin and the acrylic block copolymer form a continuous phase, the PC resin forms a dispersed phase, and most of fillers are dispersed in a resin phase containing the ABS resin and the acrylic block copolymer. It was found that it is more difficult for the acrylic block copolymer and the filler to come into close proximity with each other and it is more difficult for a plurality of fillers to come into close proximity with each other as compared with Example 3, and as a result, the structure in which sufficient impact strength was obtained was less likely to be formed.

INDUSTRIAL APPLICABILITY

The resin composition of the present disclosure is applicable as components of the other electric/electronic apparatuses, such as OA equipment, or components of attachments of electric/electronic apparatuses. Moreover, the resin composition of the present disclosure is also applicable to structural members of automobiles, airplanes, and the like, building members, food containers, and the like.

The present disclosure can provide the resin composition which contains the polycarbonate resin, the acrylonitrile-butadiene-styrene resin, and the inorganic filler and which has achieved both high impact strength and low mold shrinkage.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-251421 filed Dec. 27, 2017, which is hereby incorporated by reference herein in its entirety.

What is claimed is:

1. A resin composition comprising:
a polycarbonate resin, an acrylonitrile-butadiene-styrene resin, an elastomer, and an inorganic filler, wherein
when a sum of contents of the polycarbonate resin and the acrylonitrile-butadiene-styrene resin is set to 100 parts by mass,
the content of the polycarbonate resin is 86 parts by mass or more and 96 parts by mass or less,
the elastomer is an acrylic block copolymer,
an aspect ratio of the inorganic filler is 3 or more, and
a content of the inorganic filler is 72 parts by mass or more and 93 parts by mass or less.

2. The resin composition according to claim 1, wherein
when the sum of the contents of the polycarbonate resin and the acrylonitrile-butadiene-styrene resin is set to 100 parts by mass, a content of the acrylic block copolymer is 2 parts by mass or more and 30 parts by mass or less.

3. The resin composition according to claim 1, wherein the inorganic filler is precipitated calcium carbonate or wollastonite.

4. A resin molded article comprising:
the resin composition according to claim 1, wherein
the resin molded article is obtained by molding the resin composition.

5. The resin molded article according to claim 4, wherein
the resin molded article has a continuous phase and a dispersed phase, and
at least one part of the dispersed phase contains the acrylonitrile-butadiene-styrene resin, the acrylic block copolymer, and the filler.

6. A method for manufacturing the resin molded article according to claim 4, the method comprising:
mixing the polycarbonate resin, the acrylonitrile-butadiene-styrene resin, the elastomer, and the inorganic filler having an aspect ratio of 3 or more with each other to obtain a mixture in which the content of the polycarbonate resin is 86 parts by mass or more and 96 parts by mass or less and the content of the inorganic filler is 72 parts by mass or more and 93 parts by mass or less when the sum of the contents of the polycarbonate resin and the acrylonitrile-butadiene-styrene resin is set to 100 parts by mass;
melting and solidifying the mixture to obtain a resin of pellet-shaped particles; and
molding the resin of pellet-shaped particles by using a die.

7. An electronic apparatus comprising:
an exterior component having a resin molded article, wherein
the resin molded article according to claim 4.

8. A resin composition comprising:
a polycarbonate resin, an acrylonitrile-butadiene-styrene resin, an elastomer, and an inorganic filler, wherein
when a sum of contents of the polycarbonate resin and the acrylonitrile-butadiene-styrene resin is set to 100 parts by mass, the content of the polycarbonate resin is 86 parts by mass or more and 96 parts by mass or less,
the elastomer is an acrylic block copolymer,
an aspect ratio of the inorganic filler is 3 or more, and
the inorganic filler is precipitated calcium carbonate or wollastonite.

9. The resin composition according to claim 8, wherein
when the sum of the contents of the polycarbonate resin and the acrylonitrile-butadiene-styrene resin is set to 100 parts by mass, a content of the acrylic block copolymer is 2 parts by mass or more and 30 parts by mass or less.

10. A resin molded article comprising:
the resin composition according to claim 8, wherein
the resin molded article is obtained by molding the resin composition.

11. The resin molded article according to claim 10, wherein
the resin molded article has a continuous phase and a dispersed phase, and
at least one part of the dispersed phase contains the acrylonitrile-butadiene-styrene resin, the acrylic block copolymer, and the filler.

12. A method for manufacturing the resin molded article according to claim 10, the method comprising:
mixing the polycarbonate resin, the acrylonitrile-butadiene-styrene resin, the elastomer, and the inorganic filler having an aspect ratio of 3 or more, the inorganic filler being precipitated calcium carbonate or wollastonite, with each other to obtain a mixture in which the content of the polycarbonate resin is 86 parts by mass or more and 96 parts by mass or less when the sum of the contents of the polycarbonate resin and the acrylonitrile-butadiene-styrene resin is set to 100 parts by mass;
melting and solidifying the mixture to obtain a resin of pellet-shaped particles; and
molding the resin of pellet-shaped particles by using a die.

13. An electronic apparatus comprising:
an exterior component having the resin molded article according to claim 10.

* * * * *